United States Patent
Shatruk et al.

(10) Patent No.: US 10,329,152 B2
(45) Date of Patent: *Jun. 25, 2019

(54) METHOD OF SYNTHESIZING SOLUBLE POLYPHOSPHIDES FROM RED PHOSPHOROUS

(71) Applicant: The Florida State University Research Foundation, Inc., Tallahassee, FL (US)

(72) Inventors: Michael Shatruk, Tallahassee, FL (US); David Tyler McQuade, Arlington, VA (US); Alina Dragulescu-Andrasi, Tallahassee, FL (US); Levi Zane Miller, Tallahassee, FL (US); Chongin Pak, Tallahassee, FL (US)

(73) Assignee: The Florida State University Research Foundation, Inc., Tallahassee, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/156,249

(22) Filed: Oct. 10, 2018

(65) Prior Publication Data
US 2019/0039896 A1     Feb. 7, 2019

Related U.S. Application Data

(63) Continuation of application No. 15/428,314, filed on Feb. 9, 2017, now Pat. No. 10,167,196.

(60) Provisional application No. 62/292,985, filed on Feb. 9, 2016.

(51) Int. Cl.
C01B 25/08       (2006.01)

(52) U.S. Cl.
CPC .................. *C01B 25/081* (2013.01)

(58) Field of Classification Search
CPC .................................................. C01B 25/081
See application file for complete search history.

(56) References Cited

PUBLICATIONS

Baudler, Polyphosphorus Compounds—New Results and Perspectives. Angew. Chem. Int. Ed. Engl. May 1987; 26(5), 419-441.
Baudler, et al., Trilithium Heptaphosphide, Dilithium Hexadecaphosphide, and Trisodium Henicosaphosphide. Inorg. Synth. 1990, 27, 227.
Baudler & Exner, Chemistry of phosphorus. 121. Dilithium hexadecaphosphide (Li2P16) via nucleophilic cleavage of white phosphorus with lithium dihydrogenphosphide. Chem. Ber. 1983, 116(3), 1268-1270.
Baudler, et al., Chemistry of phosphorus. 157. Dilithium hexadecaphosphide, Li2P16: preparation from Li2HP7 and structure determination by 31P NMR spectroscopy. Z. Anorg. Allg. Chem. 1985, 529, 7-14.

(Continued)

*Primary Examiner* — Anthony J Zimmer
(74) *Attorney, Agent, or Firm* — Michele L. Lawson; Smith & Hopen, P.A.

(57) ABSTRACT

A method of synthesizing soluble polyphosphides using shelf-stable reagents and common organic solvents is presented. A reaction between an alkali metal alkoxy compound or alkali metal alkyl thiolate compound and shelf stable red phosphorus generated soluble polyphosphides in a variety of organic solvents with the $^{31}P$ NMR spectrum being used to detect the species of polyphosphides produced.

13 Claims, 7 Drawing Sheets

(56) References Cited

PUBLICATIONS

Baudler & Düster, Contributions to the chemistry of phosphorus: disodium hexadecaphosphide—preparation via cleavage of White phosphorus with sodium. Z. Naturforsch. B. Mar. 1987, 42(3), 335-336.

Baudler, et al., Chemistry of phosphorus. 162. MI3P19 (MI= lithium, sodium, potassium), the first salts with nonadecaphosphide(3-) ions. Z. Anorg. Allg. Chem. 1986, 534, 19-26.

Brown, et al., The reaction of thiolates with elemental phosphorus. Phosphorus Sulfur. 1978, 5(1), 121-122.

Brown, et al. Reaction of Elemental Phosphorus with Alkanethiolates in the Presence of Tetrachloromethane. J. Chem. Soc. Perkin Trans. 1. 1979, 7, 1799-1805.

Giffin & Masuda, Reactivity of white phosphorus with compounds of the p-block. Coord. Chem. Rev. 2011, 255(11-12), 1342-1359.

Guérin & Richeson, Facile Interconversion of Polyphosphides and Formation of a New Polyphosphide Anion. Inorg. Chem. May 1995;34(11): 2793-2794.

Miluykov, et al., Facile routes to sodium tetradecaphosphide Na4P14 and molecular structure of Na4(DME)7.5P14 and Na4(en)6P14 (DME=1,2-dimethoxyethane; en=ethylenediamine). Z. Anorg. Allg. Chem. 2006, 632(10-11): 1728-32.

Opalka, et al., Continuous proline catalysis via leaching of solid proline. Beilstein J. Org. Chem. 2011, 7: 1671-1679.

Scheer, et al., P4 activation by main group elements and compounds. Chem. Rev. Jul. 14, 2010; 110(7):4236-4256.

von Schnering, et al., Chemistry and structural chemistry of phosphides and polyphosphides. 28. Bis (tetraphenylphosphonium) hexadecaphosphide, a salt with the new polycyclic anion P162. Angew. Chem. Int. Ed. Engl. 1981, 20: 594.

Opalka, et al., Continuous synthesis and use of N-heterocyclic carbene copper(I) complexes from insoluble Cu2O. Org. Lett. Mar. 1, 2013, 15(5), 996-999.

Dragulescu-Andrasi, et al., Facile Conversion of Red Phosphorus into Soluble Polyphosphide Anions by Reaction with Potassium Ethoxide, Angew. Chem. Int. Ed. 2016, 55, 3904-3908. First published Mar. 1, 2016.

Non-Final Office Action dated May 4, 2018 for priority U.S. Appl. No. 15/428,314.

METHOD OF SYNTHESIZING SOLUBLE POLYPHOSPHIDES FROM RED PHOSPHOROUS

CROSS-REFERENCE TO RELATED APPLICATIONS

This application is a continuation of and claims priority to currently pending U.S. Nonprovisional application Ser. No. 15/428,314, entitled "Method of Conversion of Red Phosphorous to Soluble Polyphosphides", filed Feb. 9, 2017 which claims priority to U.S. Provisional Patent Application No. 62/292,985, entitled "Solubilization of Red Phosphorus by Reaction with Potassium Ethoxide", filed Feb. 9, 2016, the entirety of which is incorporated herein by reference.

FIELD OF THE INVENTION

This invention relates to chemical reactions. More specifically, the invention relates to chemical methodology for conversion of red phosphorus to polyphosphides via solution-chemistry routes.

BACKGROUND OF THE INVENTION

Polyphosphides are negatively charged clusters of phosphorus atoms that exhibit multifarious structural motifs. The majority of polyphosphides had been obtained by direct solid-state reactions between metals and red phosphorus red, ($P_{red}$) or by iodine-assisted chemical vapor transport (von Schnering & Hönle, Chemistry and structural chemistry of phosphides and polyphosphides. 48. Bridging chasms with polyphosphides. Chem. Rev., 1988 January; 88 (1): 243-273; Pöttgen, W. Hönle, H. G. von Schnering in *Encyclopedia of Inorganic Chemistry*, Vol. 8, $2^{nd}$ ed. (Ed.: R. B. King), Wiley, Chichester, 2005, p. 4268). Only a handful of uncoordinated polyphosphide anions have been obtained by solution-based methods (Baudler, Polyphosphorus Compounds—New Results and Perspectives. Angew. Chem. Int. Ed. Engl. 1987 May; 26(5), 419-441; Baudler, et al., Trilithium Heptaphosphide, Dilithium Hexadecaphosphide, and Trisodium Henicosaphosphide. Inorg. Synth. 1990, 27, 227; von Schnering, et al., Chemistry and structural chemistry of phosphides and polyphosphides. 28. Bis(tetraphenylphosphonium) hexadecaphosphide, a salt with the new polycyclic anion P162. Angew. Chem. Int. Ed. Engl. 1981, 20: 594; Miluykov, et al., Facile routes to sodium tetradecaphosphide $Na_4P_{14}$ and molecular structure of $Na_4(DME)_{7.5}P_{14}$ and $Na_4(en)_6P_{14}$ (DME=1,2-dimethoxyethane; en=ethylenediamine). Z. Anorg. Allg. Chem. 2006, 632(10-11): 1728-32), which can be explained by the difficulty in isolating these species. In general, the highly reactive polyphosphide fragments need to be captured with organic or organometallic reagents.

The long history of polyphosphides notwithstanding, there is currently a growing interest in the study of these species. Research efforts in polyphosphide chemistry have been fueled by aspirations to control the activation of the P4 molecule (Cossairt, et al., Early-transition-metal-mediated activation and transformation of white phosphorus. Chem. Rev. 2010 Jul. 14, 110(7), 4164-77; Cummins, Terminal, anionic carbide, nitride, and phosphide transition-metal complexes as synthetic entries to low-coordinate phosphorus derivatives. Angew. Chem. Int. Ed. Eng. 2006 Jan. 30, 45(6), 862-70), known as the white allotrope of the element ($P_{white}$), and by the recent discovery of phosphorene as a promising graphene analogue with a finite direct band gap (Reich, Phosphorene excites materials scientists. Nature. 2014 Feb. 6, 506(7486), 19; Xia, et al., Rediscovering black phosphorus as an anisotropic layered material for optoelectronics and electronics. Nat. Commun. 2014 Jul. 21; 5: 4458; Liu, et al., Phosphorene: an unexplored 2D semiconductor with a high hole mobility. ACS Nano. 2014 Apr. 22, 8(4), 4033-4041; Li, et al., Black phosphorus field-effect transistors. Nat. Nanotechnol. 2014 May, 9(5), 372-377; Liu, et al., The effect of dielectric capping on few-layer phosphorene transistors: tuning the Schottky barrier heights IEEE Electron. Device Lett. 2014 May, 35(7), 795-797).

Most polyphosphides prepared by solid-state methods are insoluble in common organic solvents and exhibit very high chemical stability (von Schnering & Mille, Chemistry and structural chemistry of phosphides and polyphosphides. 48. Bridging chasms with polyphosphides. Chem. Rev., 1988 January; 88 (1): 243-273; Bawoh & Nilges, Phosphorus Rich $d^{10}$ Ion Polyphosphides and Selected Materials. Z. Anorg. Allg. Chem. 2015, 641(2), 304-310) In contrast, the solution methods furnish soluble and reactive polyphosphide fragments, many of which were not detected in the solid-state reactions. Therefore, the need for a broader exploration of solution-based routes cannot be overstated, as these synthetic methods provide access to different polyphosphide species as a result of kinetically controlled, rather than thermodynamically controlled, reaction pathways. Not only do these species exhibit fascinating reactivity (Turbervill & Goicoechea, From clusters to unorthodox pnictogen sources: solution-phase reactivity of $[E_7]^{3-}$ (E=P—Sb) anions. Chem. Rev. 2014 Nov. 12, 114(21), 10807-10828) but they also might serve as precursors for high-performance materials, including 2D semiconductors (Reich, Phosphorene excites materials scientists. Nature. 2014 Feb. 6, 506 (7486), 19; Xia, et al., Rediscovering black phosphorus as an anisotropic layered material for optoelectronics and electronics. Nat. Commun. 2014 Jul. 21; 5: 4458; Liu, et al., Phosphorene: an unexplored 2D semiconductor with a high hole mobility. ACS Nano. 2014 Apr. 22, 8(4), 4033-4041; Li, et al., Black phosphorus field-effect transistors. Nat. Nanotechnol. 2014 May, 9(5), 372-377; Liu, et al., The effect of dielectric capping on few-layer phosphorene transistors: tuning the Schottky barrier heights IEEE Electron. Device Lett. 2014 May, 35(7), 795-797) and lithium-ion battery anodes (Wang, et al., Nano-Structured Phosphorus Composite as High-Capacity Anode Materials for Lithium Batteries. Angew. Chem. Int. Ed. 2012 September; 51(36): 9034-9037).

The majority of solution-based routes for producing polyphosphides employ the toxic and flammable $P_{white}$ allotrope, strongly reducing conditions, and/or cryogenic solvents (Baudler, Polyphosphorus Compounds—New Results and Perspectives. Angew. Chem. Int. Ed. Engl. 1987 May; 26(5), 419-441; Baudler, et al., Trilithium Heptaphosphide, Dilithium Hexadecaphosphide, and Trisodium Henicosaphosphide. Inorg. Synth. 1990, 27, 227; von Schnering, et al., Chemistry and structural chemistry of phosphides and polyphosphides. 28. Bis(tetraphenylphosphonium) hexadecaphosphide, a salt with the new polycyclic anion P162. Angew. Chem. Int. Ed. Engl. 1981, 20: 594; Miluykov, et al., Facile routes to sodium tetradecaphosphide $Na_4P_{14}$ and molecular structure of $Na_4(DME)_{7.5}P_{14}$ and $Na_4(en)_6P_{14}$ (DME=1,2-dimethoxyethane; en=ethylenediamine). Z. Anorg. Allg. Chem. 2006, 632(10-11): 1728-32). Such methods, therefore, are difficult to scale up, which limits the potential uses of polyphosphides and hinders more extensive studies of their reactivity. There have been a few reports whereby $P_{red}$ was used to prepare species such as $K_3P_7$, but the solvents were limited to liquid ammonia or ethylenediamine in combination with strongly reducing agents (Na or Na—K alloy) (Miluykov, et al., Facile routes to sodium tetradecaphosphide $Na_4P_{14}$ and molecular structure of $Na_4(DME)_{7.5}P_{14}$ and $Na_4(en)_6P_{14}$ (DME=1,2-dimethoxyethane; en=ethylenediamine). Z. Anorg. Allg. Chem. 2006, 632(10-11): 1728-32; Schmidbaur & Bauer, An improved preparation of tris(trimethylsilyl)heptaphosphine. Phosphorus Sulfur Silicon Relat. Elem. 1995, 102(1-4), 217-219).

As such, there is a deficiency in the art to produce soluble polyphosphides from red phosphorous. As noted above, the difficulties in the art with respect to solubilizing $P_{red}$, along with the highly toxic materials used to solubilize $P_{red}$, evidence an unmet need in the art for methods of dissolving or solubilizing $P_{red}$ or polyphosphides thereof in a liquid medium.

BRIEF SUMMARY OF THE INVENTION

Red phosphorus is solubilized by subjecting red phosphorus or a composition of black phosphorus and red phosphorus to an alkali metal alkoxy compound or alkali metal alkyl thiolate compound suspended in an organic solvent, to produce polyphosphide anions soluble in organic solvents. The alkali metal is optionally sodium or potassium. Nonlimiting examples of alkali metal alkoxy compound or alkali metal alkyl thiolate compounds include potassium ethoxide, potassium methoxide, sodium ethoxide, sodium methoxide, and sodium methyl thiolate. Optional, nonlimiting examples of organic solvents include methyl cyanide, dimethyl sulfoxide, dimethylformamide, or a combination of tetrahydrofuran and dimethoxyethane. In specific variations, the organic solvent is a combination of tetrahydrofuran and dimethoxyethane at a volume to volume ratio of 1:1.

The red phosphorus and alkali metal or alkali metal compound are reacted via reflux or an in-line packed column method. Where the reaction occurs via reflux, the reflux is performed for about 15 minutes to about 2 hours. Nonlimiting examples include 15 minutes, 20 minutes, 25 minutes, 30 minutes, 35 minutes, 40 minutes, 45 minutes, 50 minutes, 55 minutes, 1 hour, 1.1 hours, 1.2 hours, 1.25 hours, 1.3 hours, 1.4 hours, 1.5 hours, 1.6 hours, 1.7 hours, 1.75 hours, 1.8 hours, 1.9 hours, 2 hours, 2.1 hours, and 2.2 hours.

In variations using an in-line packed method, the red phosphorus or composition of black phosphorus and red phosphorus is loaded into a packing column either in an inert environment or in ambient environment and flushed with an inert gas. Optionally, the red phosphorus or composition of black phosphorus and red phosphorus has a grain size of about 1.4 mm to about 0.7 mm. Nonlimiting examples of grain sizes include 0.6 mm, 0.65 mm, 0.7 mm, 0.75 mm, 0.8 mm, 0.85 mm, 0.9 mm, 0.95 mm, 1.0 mm, 1.05 mm, 1.1 mm, 1.15 mm, 1.2 mm, 1.25 mm, 1.3 mm, 1.35 mm, 1.4 mm, 1.45 mm, 1.5 mm, 1.55 mm, and 1.6 mm. The pressure on the packing column is set to at least 1 bar. Nonlimiting examples of pressures include 1 bar, 1.5 bar, 2 bar, 2.5 bar, 3 bar, 3.5 bar, 4 bar, 4.5 bar, 5 bar, 5.5 bar, 6 bar, 6.5 bar, 7 bar, 7.5 bar, 8 bar. The packing column is heated to at least the boiling point of the alkali metal alkoxy compound or alkali metal alkyl thiolate. Nonlimiting examples of temperatures include about 80° C. to about 400° C. Specific, nonlimiting examples include 80° C., 85° C., 90° C., 95° C., 100° C., 110° C., 120° C., 130° C., 140° C., 150° C., 160° C., 170° C., 180° C., 190° C., 200° C., 210° C., 220° C., 230° C., 240° C., 250° C., 260° C., 270° C., 280° C., 290° C., 300° C., 310° C., 320° C., 330° C., 340° C., 350° C., 360° C., 370° C., 380° C., 390° C., and 400° C. In specific variations, the temperature of the packing column or a reaction solution does not exceed the critical temperature of the organic solvent. The alkali metal alkoxy compound or alkali metal alkyl thiolate compound is suspended in the organic solvent and then flowed through the packing column to form a compound containing the alkali metal and polyphosphide anions. The compound containing the alkali metal and polyphosphide anions is optionally collected and optionally further processed. Alternatively, the black phosphorus is separated from the polyphosphide anions.

In certain variations, the packing column is stainless steel, cast aluminum, A10 aluminum, A12 aluminum, stainless steel, aluminum-nickel alloy (50-50), polyimide, polyethylene terephthalate, polyamide-imide, nylon, polyvinyl chloride, polycarbonate, polyphthalamide, polysulfone, maleimide/bismaleimide, polyetheretherketone, polyetherimide, polyimide, polyester, acrylonitrile butadiene styrene, carbon reinforced-polyimide, carbon reinforced-polyethylene terephthalate, carbon reinforced-polyamide-imide, carbon reinforced-nylon, carbon reinforced-polyvinyl chloride, carbon reinforced-polycarbonate, carbon reinforced-polyphthalamide, carbon reinforced-polysulfone, carbon reinforced-maleimide/bismaleimide, carbon reinforced-polyetheretherketone, carbon reinforced-polyetherimide, carbon reinforced-polyimide, carbon reinforced-polyester, carbon reinforced-acrylonitrile butadiene styrene, glass reinforced-polyimide, glass reinforced-polyethylene terephthalate, glass reinforced-polyamide-imide, glass reinforced-nylon, glass reinforced-polyvinyl chloride, glass reinforced-polycarbonate, glass reinforced-polyphthalamide, glass reinforced-polysulfone, glass reinforced-maleimide/bismaleimide, glass reinforced-polyetheretherketone, glass reinforced-polyetherimide, glass reinforced-polyimide, glass reinforced-polyester, or glass reinforced-acrylonitrile butadiene styrene. In specific variations of the packing column, the column has an internal diameter of about 9 mm and a length of about 65 mm. However, it is apparent that the dimensions of the packing column can vary without deviating from the scope of the invention. For example, the column optionally has a diameter of 8 mm, 8.1 mm, 8.2 mm, 8.3 mm, 8.4 mm, 8.5 mm, 8.6 mm, 8.7 mm, 8.8 mm, 8.9 mm, 9.0 mm, 9.1 mm, 9.2 mm, 9.3 mm, 9.4 mm, 9.5 mm, 9.6 mm, 9.7 mm, 9.8 mm, 9.9 mm, 10.0 mm, 10.1 mm, 10.2 mm, 10.3 mm, 10.4 mm, 10.5 mm, 10.6 mm, 10.7 mm, 10.8 mm, 10.9 mm, 11.0 mm, 11.1 mm, 11.2 mm, 11.3 mm, 11.4 mm, 11.5 mm, 11.6 mm, 11.7 mm, 11.8 mm, 11.9 mm, and 12.0 mm. Other diameters are also envisioned in the invention. Similarly, the packing column optionally has a length of 60 mm, 60.5 mm, 61 mm, 61.5 mm, 62 mm, 62.5 mm, 63 mm, 63.5 mm, 64 mm, 64.5 mm, 65 mm, 65.5 mm, 66 mm, 66.5 mm, 67 mm, 67.5 mm, 68 mm, 68.5 mm, 69 mm, 69.5 mm, and 70 mm. Other column lengths are also envisioned in the invention.

The alkali metal alkoxy compound or alkali metal alkyl thiolate is flowed through the packing column at a rate of about 0.5 mL min$^{-1}$.

Where the solubilized phosphorus is desired, after reacting the red phosphorus with the alkali metal alkoxy compound or alkali metal alkyl thiolate compound, the organic solvent is evaporated off the compound containing the alkali metal and polyphosphide anions. The material containing the polyphosphide anions is optionally redissolved in ethanol. In some variations, the material dissolved in ethanol is then exposed to a cation exchange with $(Bu_4N)Cl$ in ethanol to produce a cation-polyphosphide material, followed by redissolving the cation-polyphosphide material in acetonitrile to form free polyphosphide anions. Nonlimiting examples of free polyphosphide anions are $P_5^-$, $P_{16}^{2-}$, $P_{21}^{3-}$, or a combination thereof.

BRIEF DESCRIPTION OF THE DRAWINGS

This patent or application file contains at least one drawing executed in color. Copies of this patent or patent application publication with color drawings will be provided by the Office upon request and payment of the necessary fee.

For a fuller understanding of the invention, reference should be made to the following detailed description, taken in connection with the accompanying drawings, in which.

DETAILED DESCRIPTION OF THE PREFERRED EMBODIMENT

Figure 1:
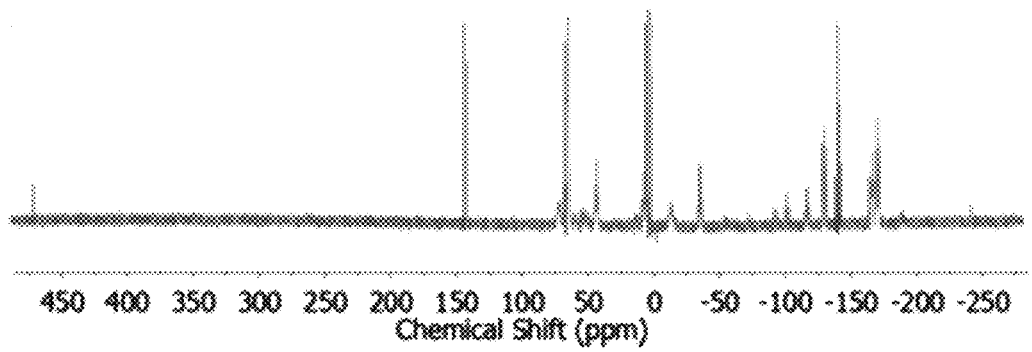
FIG. 1 is a graph showing the $^{31}P\{^1H\}$ NMR spectra of solutions obtained from reactions of $P_{red}$ with KOtBu in THF/DME (1:1 v/v).

In the following detailed description of the preferred embodiments, reference is made to the accompanying drawings, which form a part thereof, and within which are shown by way of illustration specific embodiments by which the invention may be practiced. It is to be understood that other embodiments may be utilized and structural changes may be made without departing from the scope of the invention.

As used in this specification and the appended claims, the singular forms "a", "an", and "the" include plural referents unless the content clearly dictates otherwise. As used in this specification and the appended claims, the term "or" is generally employed in its sense including "and/or" unless the context clearly dictates otherwise.

As used herein, "about" means approximately or nearly and in the context of a numerical value or range set forth means±15% of the numerical.

As used herein, "red phosphorus" means a polymeric molecule of phosphorus, wherein one bond in a tetrahedron structure is bound to an adjacent tetrahedron structure resulting in a chain-like molecule having an amorphous structure.

Red phosphorus may be formed through thermal decomposition of white phosphorus at around 250° C. to 300° C. (482° F. to 572° F.) or by exposing white phosphorus to sunlight.

As used herein, "black phosphorus" or $P_{black}$ refers to an allotrope of phosphorus that appears black and flakey. The allotrope comprises an orthorhombic or cubic crystalline structure having puckered sheets and which possess conductivity, a large direct band gap and directional anisotropy. $P_{black}$ is generally formed from thermal decomposition of white phosphorus at elevated pressures (typically around 12,000 ATM), though other methods of synthesis, such as catalysis, are envisioned.

As used herein, "white phosphorus" or $P_{white}$ refers to an allotrope of phosphorus having a white or light yellow color. The allotrope is very reactive. $P_{white}$ possesses a tetrahedral or cubic crystalline structure.

As used herein, "alkali metal" refers to the elements lithium, sodium, and potassium, including mixtures thereof.

As used herein, "alkali metal compound" refers to a compound incorporating an alkali metal into the structure and having the alkali metal bound via an electrostatic bond.

As used herein, "organic solvent" to a hydrocarbon liquid that dissolves a solid, liquid, or gaseous solute, resulting in a solution. The term organic solvent refers to compounds that contain carbon atoms, i.e. are organic compounds.

As used herein, "inert environment" is an environment or atmosphere that is substantially free of oxygen. In some embodiments, the inert environment consists of inert gases, a mixture of inert gases, or a vacuum.

As used herein, "inert gas" or "inert gases" refer to noble gases (group 18).

As used herein, "polyphosphide anions" are negatively charged molecules that contain P—P bonds. The polyphosphide anions possess increased solubility compared to phosphorus allotropes or variants, such as white phosphorus, black phosphorus, and red phosphorus.

As used herein, "grain size" refers to the average diameter of a solid material when in a liquid medium.

A facile solution-based method for activating red phosphorus with nucleophilic reagents, yielding soluble polyphosphides by heating at reflux under mild conditions is provided. Moreover, by employing a solution-phase activator, this reaction was adapted to a flow-chemistry process to afford continuous production of soluble polyphosphides.

Activation of $P_{red}$ was initiated by surveying approaches that were previously used for the activation of $P_{white}$ to form polyphosphides by using alkali metals (Guérin & Richeson, Facile Interconversion of Polyphosphides and Formation of a New Polyphosphide Anion. Inorg. Chem. 1995 May; 34(11): 2793-2794), LiPH$_2$, (Baudler & Exner, Chemistry of phosphorus. 121. Dilithium hexadecaphosphide (Li$_2$P$_{16}$) via nucleophilic cleavage of white phosphorus with lithium dihydrogenphosphide. Chem. Ber. 1983, 116(3), 1268-1270; Baudler, et al., Chemistry of phosphorus. 157. Dilithium hexadecaphosphide, Li$_2$P$_{16}$: preparation from Li$_2$HP$_7$ and structure determination by $^{31}$P NMR spectroscopy. Z. Anorg. Allg. Chem. 1985, 529, 7-14; Baudler & Duster, Contributions to the chemistry of phosphorus: disodium hexadecaphosphide-preparation via Cleavage of White phosphorus with sodium. Z. Naturforsch. B. 1987 March, 42(3), 335-336; Baudler, et al., Chemistry of phosphorus. 162. MI$_3$P$_{19}$ (MI=lithium, sodium, potassium), the first salts with nonadecaphosphide(3-) ions. Z. Anorg. Allg. Chem. 1986, 534, 19-26), or sodium naphthalenide (Cummins, et al., The stannylphosphide anion reagent sodium bis(triphenylstannyl) phosphide: synthesis, structural characterization, and reactions with indium, tin, and gold electrophiles. Inorg. Chem. 2014 Apr. 7; 53(7):3678-3687).

Earlier reports described the activation of $P_{white}$ by various nucleophilic reagents (Brown, et al., The reaction of thiolates with elemental phosphorus. Phosphorus Sulfur. 1978, 5(1), 121-122; Brown, et al., Reaction of Elemental Phosphorus with Alkanethiolates in the Presence of Tetrachloromethane. J. Chem. Soc. Perkin Trans. 1. 1979, 7, 1799-1805; Giffin & Masuda, Reactivity of white phosphorus with compounds of the p-block. Coord. Chem. Rev. 2011, 255(11-12), 1342-1359; Scheer, et al., P4 activation by main group elements and compounds. Chem. Rev. 2010 Jul. 14; 110(7):4236-4256). A similar approach was tested to activate $P_{red}$, which is commonly thought of as a more inert phosphorus source.

Example 1

All manipulations with air- and moisture-sensitive compounds were performed under an inert-gas atmosphere by using standard Schlenk techniques or an Ar-filled glovebox. Red phosphorus (99.999%, Alfa Aesar) and all anhydrous solvents (Sigma-Aldrich) were used as received. KOEt was freshly prepared from EtOH and K metal (99.5%, Sigma-Aldrich) and dried under vacuum overnight. Reaction mixtures were sampled for analysis by $^{31}$P NMR spectroscopy in air-free NMR tubes. Conversions were determined indirectly by isolation and weighing of unreacted $P_{red}$ starting material. Elemental analyses (C, H, N, P) were performed by Midwest MicroLab, LLC.

Figure 3:
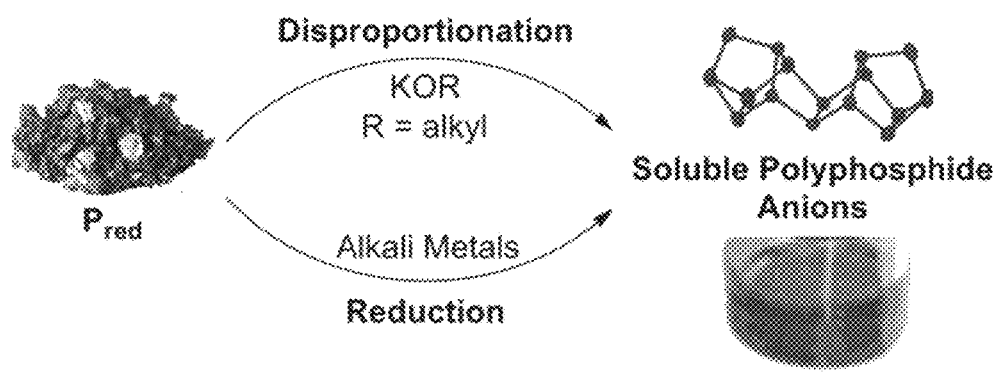
FIG. 3 is an illustration of the solution-based activation pathways for red phosphorus.
Figure 4:
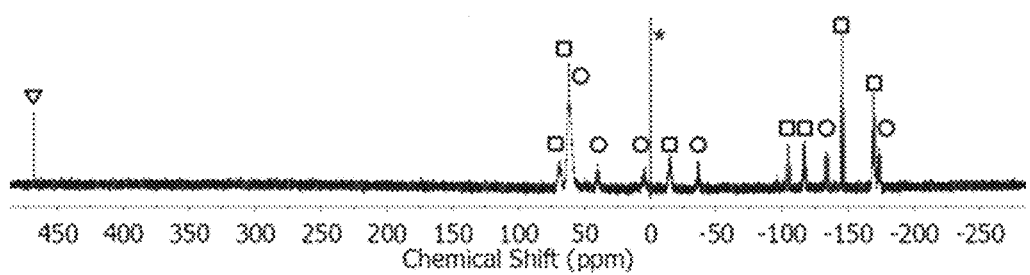
FIG. 4 is a graph showing the $^{31}P\{^1H\}$ NMR spectra of reaction mixtures obtained from the activation of $P_{red}$ with K. Symbols indicate resonances from $P_5^-$ (△). $P_{21}^{3-}$ (□). $P_{16}^{2-}$ (○), P(OEt)$_3$ (Δ), and the external shift reference (*).

Activation of $P_{red}$ was undertaken using small pieces of K (30 mg, 0.8 mmol) and $P_{red}$ (50 mg, 1.6 mmol), suspended in DME/THF (3 mL; 1:1 v/v), as seen in FIG. 3. The mixture was heated under reflux for 3 h. By reacting $P_{red}$ with potassium metal in refluxing THF/DME (1:1 v/v; DME=1, 2-dimethoxyethane), orange/red solutions were obtained that contained a mixture of soluble polyphosphide anions, specifically $P_5^-$, $P_{16}^{2-}$, and $P_{21}^{3-}$, according to the $^{31}$P NMR spectra, as seen in FIG. 4. The chemical shift values of the corresponding resonance signals coincide well with previously reported values.

The resulting bright-orange solution was allowed to cool to RT and was then evaporated to dryness under reduced pressure. The dark-red residue was dissolved in anhydrous EtOH to yield a dark-red solution, which contained exclusively $K_2P_{16}$ (as determined by $^{31}$P NMR spectroscopy).

Figure 5:
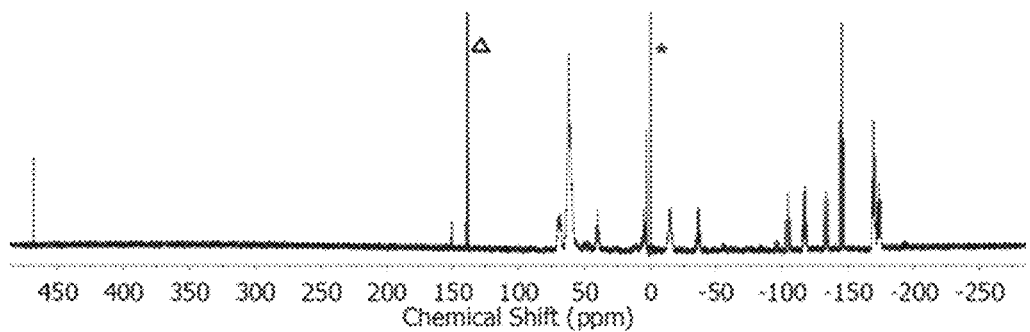
FIG. 5 is a graph showing the $^{31}P\{^1H\}$ NMR spectra of reaction mixtures obtained from the activation of $P_{red}$ with KOEt. Symbols indicate resonances from $P_5^-$ (△), $P_{21}^{3-}$ (□). $P_{16}^{2-}$ (○). P(OEt)$_3$ (Δ), and the external shift reference (*).
Figure 6:
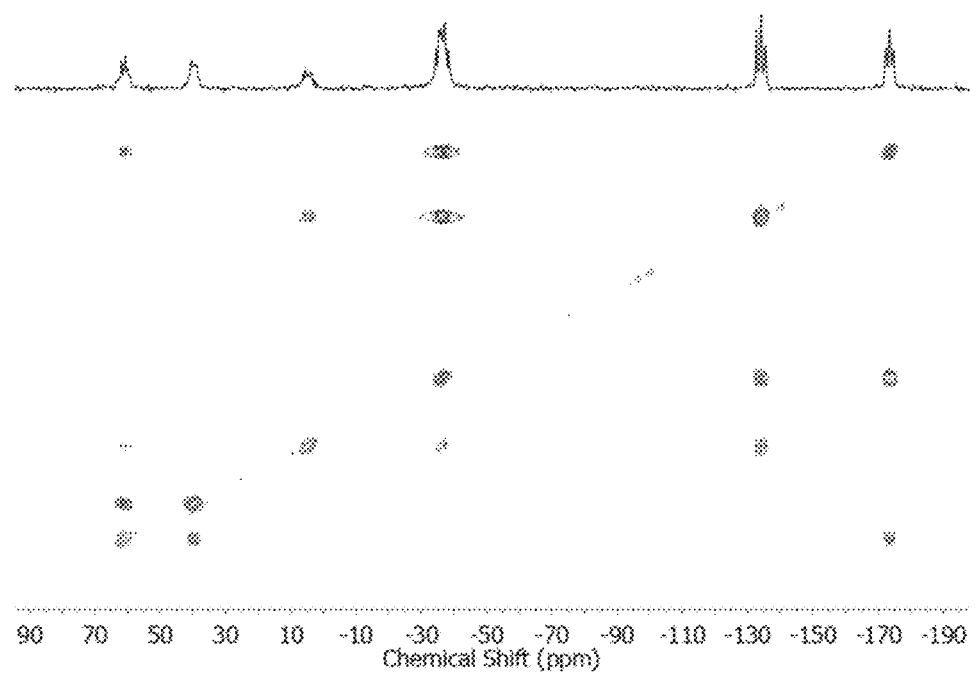
FIG. 6 is a graph showing the $^{31}P$-$^{31}P$ COSY NMR spectrum of $K_2P_{16}$ in EtOH.

Next, a solution of potassium ethoxide (KOEt) was used, which led to a remarkable activation of $P_{red}$ in less than 2 h, as seen in FIG. 5. The activation by KOEt proceeded successfully in a variety of organic solvents, with the exception of low-boiling hydrocarbons, as seen in Table 1. The resonance signals detected in the $^{31}$P NMR spectrum were assigned to the $P_5^-$, $P_{16}^{2-}$, and $P_{21}^{3-}$ ions.

TABLE 1

Reaction of $P_{red}$ with KOEt in various solvents.

| Solvent | T [° C.] | Reaction time [h] | Polyphosphides produced |
|---|---|---|---|
| Pentane | 36.1 | 24 | No reaction |
| Hexane | 69 | 24 | No reaction |
| MeCN | 81.6 | 2 | $P_{16}^{2-}$, $P_{21}^{3-}$, $P_5^-$ |
| THF/DME (1:1) | 85 | 2 | $P_{16}^{2-}$, $P_{21}^{3-}$, $P_5^-$ |
| DMF | 153 | 24 | $P_5^-$ (major), $P_{16}^{2-}$, $P_{21}^{3-}$ |
| DMSO | 189 | 0.25 | $P_5^-$ (major), $P_{16}^{2-}$, $P_{21}^{3-}$ |

The reaction conditions were tested using different nucleophiles and reaction conditions in order to achieve the conversion of the $P_{red}$ allotrope into various polyphosphide anions. Alkali metal-based oxyalkyl and thiolate compounds were found to effectively dissolve $P_{red}$, as seen in Table 2.

TABLE 2

Effect of various activators on the dissolution of $P_{red}$.

| Activator | Solvent | Temperature, ° C. | Reaction time, h |
|---|---|---|---|
| Na- and K-methoxides and ethoxides | MeCN | 81.6 | 2 |
| | THF/DME (1:1 v/v) | 85 | 2 |
| | DMF | 153 | 0.25 |
| | DMSO | 189 | 0.25 |
| K-t-butoxide and n-hexoxide; Na-thiolates | THF/DME (1:1 v/v) | 85 | 24-48 |

The activation of $P_{red}$ with redox-inactive KOEt in THF/DME is drastically different from common approaches used for the synthesis of polyphosphides. However, the nucleophilic attack that initiates a cascade of disproportionation reactions and rearrangements was proposed as the mechanism for the conversion of $P_{white}$ to organophosphorus compounds by p-block nucleophiles (Scheer, et al., $P_4$ activation by main group elements and compounds. Chem. Rev. 2010 Jul. 14; 110(7):4236-4256).

Solution $^{31}$P NMR spectra were obtained on a Bruker AVANCE III 600 spectrometer operating at frequencies of 600.13 MHz for $^1$H and 242.96 MHz for $^{31}$P with a 5-mm broadband probe. The chemical shifts were referenced to 85% phosphoric acid ($H_3PO_4$) at 0 ppm. Each sample was prepared under inert atmosphere by sampling 0.45 mL of reaction mixture (or redissolving solid samples in appropriate solvents), filtering, and dispensing into an air-free NMR tube followed by insertion of a sealed coaxial insert (85% $H_3PO_4$ in $D_2O$) for locking and referencing purposes.

Indeed, the $^{31}$P NMR spectrum of the crude mixture obtained from the activation of $P_{red}$ with KOEt contains an intense signal at δ=138 ppm, as seen in FIG. 5, which corresponds to $P(OEt)_3$, the main byproduct of the disproportionation reaction:

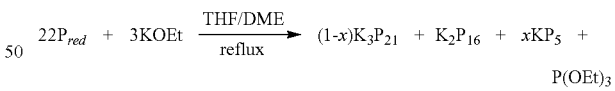

$$22P_{red} + 3KOEt \xrightarrow{\text{THF/DME} \atop \text{reflux}} (1-x)K_3P_{21} + K_2P_{16} + xKP_5 + P(OEt)_3$$

The observation of the formation of the $P(OEt)_3$ byproduct, which was not detected in the activation of $P_{red}$ with K metal, as seen in FIG. 4, corroborates the proposed nucleophilic initiation of the transformation as described by the equation above.

Figure 2:
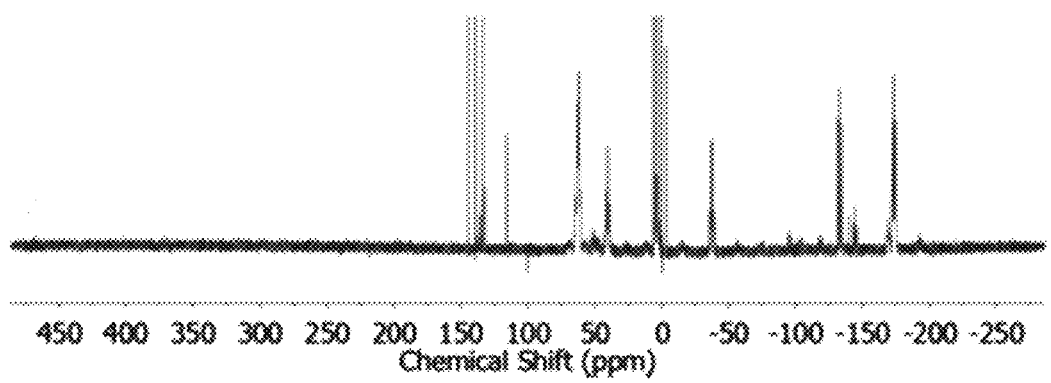
FIG. 2 is a graph showing the $^{31}P\{^1H\}$ NMR spectra of solutions obtained from reactions of $P_{red}$ with KOnHex in THF/DME (1:1 v/v).

To further probe the activation mechanism, the effects of the nucleophile strength, KOR, was investigated by varying the length and bulk of the alkyl substituent. As the R group was changed from ethyl to n-hexyl, the reaction rate decreased substantially; full conversion of $P_{red}$ was achieved in 12-24 h for R=n-hexyl, whereas less than 2 h were required with R=ethyl. Full conversion was never reached for R=t-butyl, as judged by the observation of unreacted $P_{red}$ in the reaction vessel even after 96 h. These results also provide strong support for the nucleophilic activation of $P_{red}$, as seen in FIGS. 1 and 2.

Figure 7:
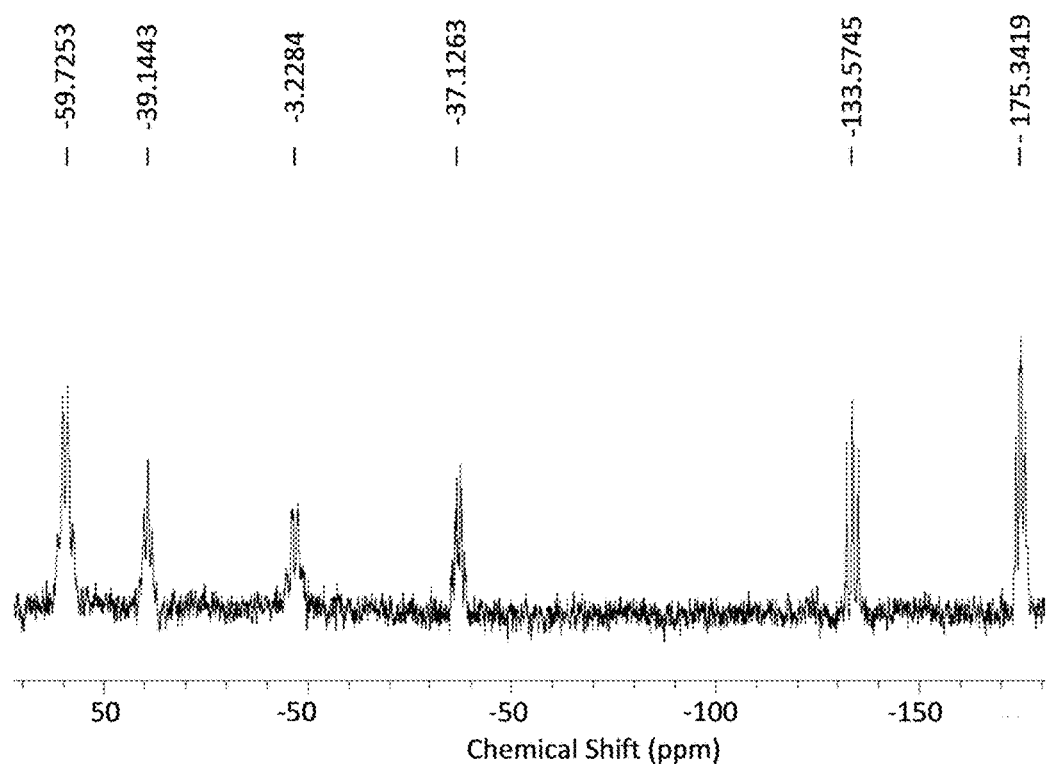
FIG. 7 is a graph showing the $^{31}P\{^1H\}$ NMR spectrum of (TBA)$_2P_{16}$ in acetonitrile-d$_3$.

The crude mixture of polyphosphides obtained by the reaction of $P_{red}$ with KOEt in THF/DME was evaporated to dryness. The residue was redissolved in EtOH, and the mixture was filtered to afford a dark-red solution. This solution was found to contain exclusively $K_2P_{16}$, as confirmed by the 2D $^{31}P$-$^{31}P$ COSY NMR spectrum, as seen in FIGS. 1 and 2. The $P_{16}^{2-}$ polyphosphide ion was successfully crystallized by cation exchange with $(Bu_4N)Cl$ in EtOH. The X-ray crystal structure determination confirmed the formation of $(Bu_4N)_2P_{16}$. The compound can be redissolved in acetonitrile, with the $P_{16}^{2-}$ polyanion remaining intact, as judged by the $^{31}P$ NMR spectrum, as seen in FIG. 7. In this solution, a protonated $[HP_{16}]^-$ ion (m/z 496.6) was also detected using negative-mode electrospray ionization mass spectrometry (ESI-MS).

Figure 8:
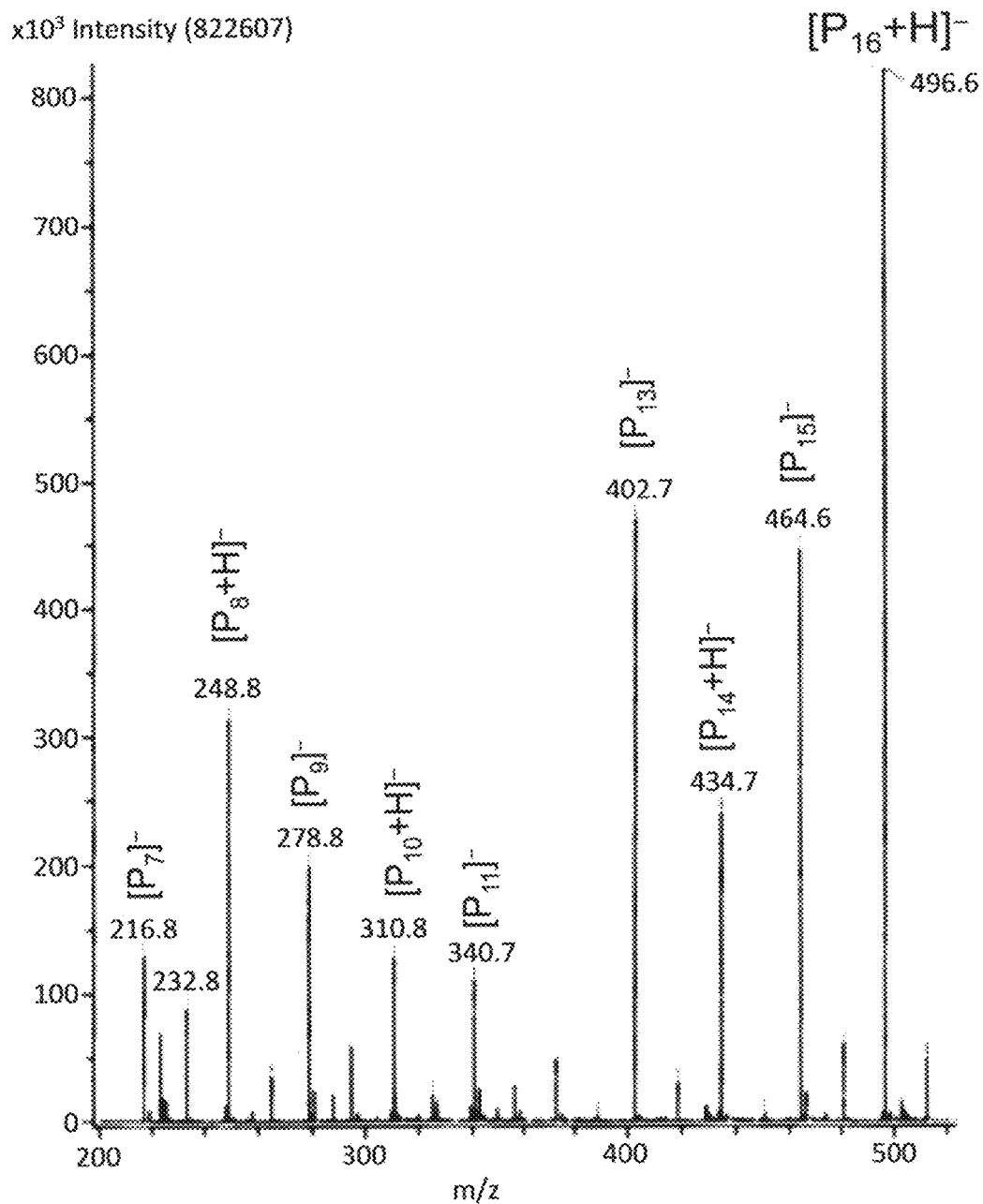
FIG. 8 is a graph showing the low-resolution ESI mass spectra of a $(Bu_4N)_2P_{16}$ solution in acetonitrile.
Figure 9:
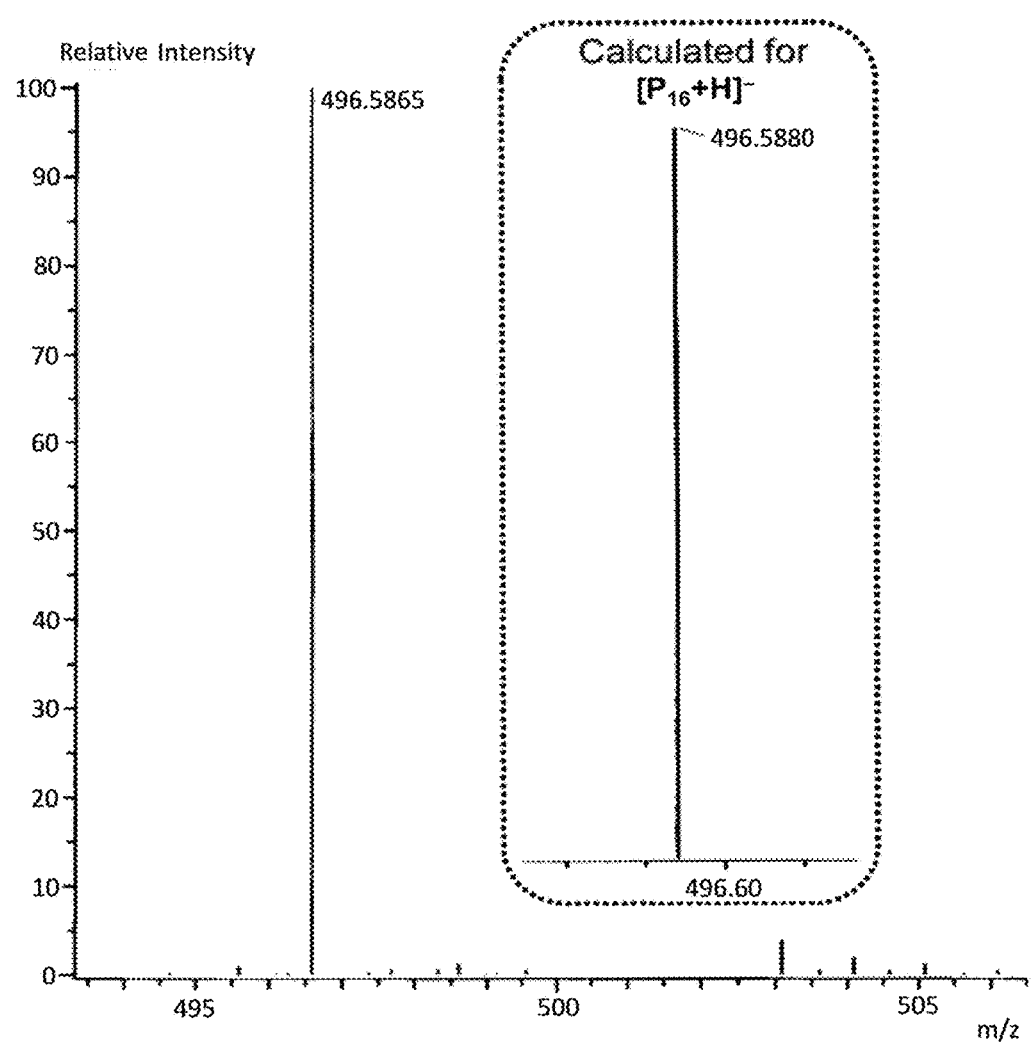
FIG. 9 is a graph showing the high-resolution ESI mass spectra of a $(Bu_4N)_2P_{16}$ solution in acetonitrile.

The ESI-MS data were collected with a JEOL AccuTOF Time-of-Flight mass spectrometer. Solutions of $(Bu_4N)_2P_{16}$ in acetonitrile were analyzed in negative ionization mode. The instrument was calibrated with a mixture of SDS and sodium taurocholate for high-resolution mass determination. The dominant peak at mass-to-charge ratio (m/z) 496.5865 was assigned to $[HP_{16}]^-$ molecular ion (predicted m/z 496.5880). Along with the $[HP_{16}]^-$ molecular ion, peaks corresponding to fragmentation ions were also observed, as seen in FIGS. 8 and 9.

Example 2

All manipulations with air- and moisture-sensitive compounds were performed under an inert-gas atmosphere by using standard Schlenk techniques or an Ar-filled glovebox. Red phosphorus (99.999%, Alfa Aesar) and all anhydrous solvents (Sigma-Aldrich) were used as received. KOEt was freshly prepared from EtOH and K metal (99.5%, Sigma-Aldrich) and dried under vacuum overnight. Reaction mixtures were sampled for analysis by $^{31}P$ NMR spectroscopy in air-free NMR tubes. Conversions were determined indirectly by isolation and weighing of unreacted $P_{red}$ starting material. Elemental analyses (C, H, N, P) were performed by Midwest MicroLab, LLC.

Synthesis of $(Bu_4N)_2P_{16}$: Solid KOEt (136 mg, 1.6 mmol) was dissolved in DME/THF (3 mL; 1:1 v/v) and $P_{red}$ (50 mg, 1.6 mmol) was added to the solution. The suspension was heated to reflux for 2 h. The resulting bright-orange suspension was allowed to cool to RT and was then evaporated to dryness under vacuum. The dark-red residue was dissolved in anhydrous EtOH to form a dark-red solution, which contained exclusively $K_2P_{16}$ (as determined by $^{31}P$ NMR). Following cation exchange with $(Bu_4N)Cl$ in EtOH, the $P_{16}^{2-}$ polyanion was isolated as the brown-red salt $(Bu_4N)_2P_{16}$. Yield=62 mg (63%). HRMS ($E_{51}^-$): m/z calcd for the $[HP_{16}]^-$ ion 496.5880; found 496.5865. $^{31}P\{^1H\}$ NMR ($[D_3]MeCN$, 20° C., 242.96 MHz): δ=60, 39, 3.23, −37, −134, −175 ppm. A satisfactory elemental analysis could not be obtained for this material, presumably because of the extreme sensitivity of the product.

Example 3

The use of shelf-stable $P_{red}$ instead of highly reactive $P_{white}$ allows was analyzed as a scalable, new reaction through flow-chemistry approaches. Based on work with solid reagents packed in flow reactors (Opalka, et al., Continuous proline catalysis via leaching of solid proline. Beilstein J. Org. Chem. 2011, 7: 1671-1679; Opalka, et al., Continuous synthesis and use of N-heterocyclic carbene copper(I) complexes from insoluble $Cu_2O$. Org. Lett. 2013 Mar. 1, 15(5), 996-999; Longstreet, et al., Investigating the continuous synthesis of a nicotinonitrile precursor to nevirapine. Beilstein J Org Chem. 2013 Nov. 20; 9: 2570-2578; Alonso, et al., Continuous synthesis of organozinc halides coupled to Negishi reactions. Adv. Synth. Catal. 2014, 356(18), 3737-3741), rapid conversion of $P_{red}$ to form soluble polyphosphides was tested achieved using a packed-bed method. To this end, $P_{red}$ was loaded as a packed bed in a stainless steel column.

All manipulations with air- and moisture-sensitive compounds were performed under an inert-gas atmosphere by using standard Schlenk techniques or an Ar-filled glovebox. Red phosphorus (99.999%, Alfa Aesar) and all anhydrous solvents (Sigma-Aldrich) were used as received. KOEt was freshly prepared from EtOH and K metal (99.5%, Sigma-Aldrich) and dried under vacuum overnight. Reaction mixtures were sampled for analysis by $^{31}P$ NMR spectroscopy in air-free NMR tubes. Conversions were determined indirectly by isolation and weighing of unreacted $P_{red}$ starting material. Elemental analyses (C, H, N, P) were performed by Midwest MicroLab, LLC.

A coarse 14-25 mesh (1.4-0.7 mm) powder of $P_{red}$ (5.7 g, 2.25 mol) was loaded as a packed bed in a stainless steel column (internal diameter=9 mm, length=65 mm) in ambient atmosphere. While other sized particles worked, smaller particles could lead to inconsistent flow profiles or channeling of the reagent solution around the packed bed and occasional clogging. A Phoenix flow reactor (ThalesNano) was used to apply heat (80° C.) and pressure (8 bar). After packing the column, the column was flushed with argon. A solution of KOEt (0.38 M) in THF/DME (1:1 v/v) was driven through the packed bed with micro HPLC pumps (ThalesNano) at a rate of 0.5 mL min$^{-1}$.

Figure 10:
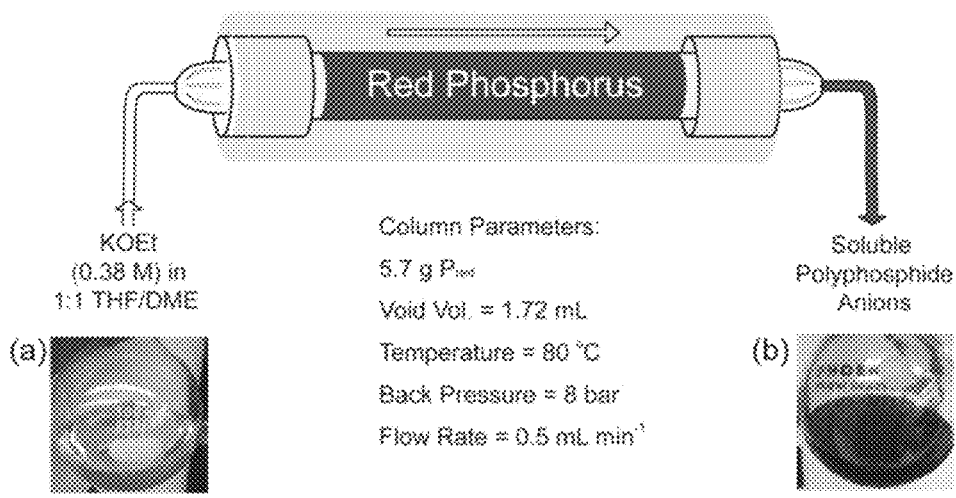
FIG. 10 is an illustration showing the flow reactor diagram displaying the nearly colorless solution of KOEt in THF/DME (a) flowing into the $P_{red}$-loaded reactor and the red solution of polyphosphides exiting the column followed by collection into a round-bottom flask (b).

As seen in FIG. 10, the flow-reactor diagram began with a nearly colorless solution of KOEt in THF/DME flowing into the $P_{red}$-loaded reactor, as seen in the inset (a), and upon reaction with $P_{red}$ resulted in the dark-red solution of polyphosphides exiting the column, followed by collection into a round-bottom flask, as seen in the inset (b). After 5 h of continuous operation, 150 mL of 0.03 M polyphosphide solution (the concentration calculated per P atom), identified as a dark-red solid, was isolated by removing the volatile compounds under reduced pressure.

The solution was collected under an inert atmosphere and sampled directly for characterization by $^{31}P$ NMR spectroscopy, which confirmed the presence of the same mixture of polyphosphides as detected in, as seen in FIGS. 4 and 5. The solvent was removed under reduced pressure to yield solid products, which could be redissolved in EtOH to yield a solution of pure $K_2P_{16}$.

The solid was readily soluble in EtOH and yielded a spectroscopically pure solution of $K_2P_{16}$ in nearly quantitative yield. $^{31}P\{^1H\}$ NMR (EtOH, 85% $H_3PO_4$ external reference, 20° C., 242.96 MHz): δ=60, 40, 4.69, −37, −134, −174 ppm.

In conclusion, a new top-down approach for the activation of red phosphorus was demonstrated to afford a fast and convenient synthesis of soluble polyphosphides using shelf-stable reagents and common organic solvents. The mild nucleophilic activation of $P_{red}$ with KOEt is in striking contrast to the previously reported activation of $P_{red}$ which required the use of strong reductants, specifically alkali metals. This nucleophilic activation was also adapted to a flow-chemistry reactor, providing a method for the continuous multigram synthesis of polyphosphides. The methodology herein can enable widespread access to these structurally diverse species, which could lead to rapid elucidation of their reactivity pathways.

Example 4

Black phosphorus ($P_{black}$) is an allotrope of phosphorus that is stable at ambient temperatures and pressures. It possesses an orthorhombic structure and exhibits a black flakey structure from the puckered structure of the phosphorus atoms. $P_{black}$ has garnered interest due to its ability to form thin films, along with its large band gap (from about 0.3 to about 2.0 electron volts) and directional anisotropy, allowing its use as field effect transistors, semiconductors, and light detectors. However, $P_{black}$ is currently formed from by transformation of $P_{red}$ under high temperature and/or pressure, and consequently contains impurities of $P_{red}$ in the material. The method was used to separate $P_{red}$ from $P_{black}$.

KOEt was freshly prepared from EtOH and K metal (99.5%, Sigma-Aldrich) under an inert-gas atmosphere by using standard Schlenk techniques or an Ar-filled glovebox and dried under vacuum overnight.

Black phosphorus ($P_{black}$) was synthesized from amorphous red phosphorus ($P_{red}$) according to a published procedure (Lange et al., Inorg. Chem. 2007, 46, 4028-4035). After synthesis, a batch of $P_{black}$ crystals was separated mechanically from byproducts; upon observation under a microscope, however, unreacted deposits of $P_{red}$ were still visible on the surface of BP crystals.

To remove this $P_{red}$ contaminant, solid KOEt (136 mg, 1.6 mmol) was dissolved in anhydrous DME/THF (3 mL; 1:1 v/v) and added to a vial (Ø14 mm) containing BP crystals (~150 mg) under inert gas. Standard Schlenk techniques were employed for this experiment. The vial was heated to reflux for 24 h.

During reflux, the $P_{red}$ deposits that covered the surface of $P_{black}$ crystals were converted to soluble polyphosphides as indicated by the orange-red color of the resulting solution. At the same time, the $P_{black}$ crystals remained intact. The vial was allowed to cool to room temperature, and the solution was evaporated to dryness under vacuum. The $P_{black}$ crystals were washed with anhydrous ethanol (5×5 mL) under inert gas and dried under vacuum. After drying, the crystals were transferred to a plastic container for microscopic examination. Microscopic analysis showed red phosphorus deposits, which were visible prior to $P_{red}$ extraction, were not visible under microscopic observation after extraction.

Example 5

The method was used to separate $P_{red}$ from $P_{black}$ using flow-chemistry approaches.

A coarse 14-25 mesh (1.4-0.7 mm) powder of $P_{black}$ (5.7 g, 2.25 mol), containing of $P_{red}$ was loaded as a packed bed in a stainless steel column (internal diameter=9 mm, length=65 mm) in ambient atmosphere. While other sized particles worked, smaller particles could lead to inconsistent flow profiles or channeling of the reagent solution around the packed bed and occasional clogging. A Phoenix flow reactor (ThalesNano) was used to apply heat (80° C.) and pressure (8 bar). After packing the column, the column was flushed with argon. A solution of KOEt (0.38 M) in THF/DME (1:1 v/v) was driven through the packed bed with micro HPLC pumps (ThalesNano) at a rate of 0.5 mL min$^{-1}$.

The flow-reactor diagram began with a nearly colorless solution of KOEt in THF/DME flowing into the P-loaded reactor, and upon reaction with $P_{red}$ resulted in the dark-red solution of polyphosphides exiting the column, followed by collection into a round-bottom flask. After 5 h of continuous operation, 150 mL of 0.03 M polyphosphide solution (the concentration calculated per P atom), identified as a dark-red solid, was isolated by removing the volatile compounds under reduced pressure.

The solution was collected under an inert atmosphere and sampled directly for characterization by $^{31}$P NMR spectroscopy, which confirmed the presence of the same mixture of polyphosphides as detected in, as seen in FIGS. 4 and 5.

The stainless steel column was then opened and the $P_{black}$ removed. Analysis of the $P_{black}$ indicated that the in-line column extracted the $P_{red}$ from the $P_{black}$, resulting in higher purity $P_{black}$ material. The activation of red phosphorus affords a fast and convenient method for the synthesis of soluble polyphosphides using shelf-stable reagents and common organic solvents, followed by removal of the soluble polyphosphides from black phosphorus. Nucleophilic activation of $P_{red}$ with KOE was adapted to a flow chemistry reactor, providing a method for the continuous synthesis of polyphosphides and removal of the $P_{red}$ impurities from $P_{black}$.

All referenced publications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A method for producing polyphosphide anions soluble in organic solvents, comprising:
   providing red phosphorus or a composition of black phosphorus and red phosphorus;
   providing an alkali metal alkoxy compound or alkali metal alkyl thiolate compound suspended in an organic solvent;
   wherein the alkali metal is sodium or potassium;
   allowing the red phosphorus and alkali metal or alkali metal compound to react, wherein the reaction uses reflux or an in-line packed column method;
   where the in-line packed column method comprises:
      providing a packing column;
      loading the packing column with the red phosphorus or composition of black phosphorus and red phosphorus in an inert environment;
      purging the packing column with an inert gas;
      setting a pressure regulator on the packing column to at least 1 bar;
      heating the packing column to a preselected temperature, where the preselected temperature is at least the boiling point of the alkali metal alkoxy compound or alkali metal alkyl thiolate and wherein the temperature of the packing column or a reaction solution does not exceed the critical temperature of the organic solvent;

suspending the alkali metal alkoxy compound or alkali metal alkyl thiolate compound in the organic solvent;

flowing the organic solvent through the packing column;

flowing the alkali metal alkoxy compound or alkali metal alkyl thiolate compound in the organic solvent through the packing column;

forming a compound containing the alkali metal and polyphosphide anions;

evaporating the organic solvent off the compound containing the alkali metal and polyphosphide anions;

redissolving the compound containing the alkali metal and polyphosphide anions in ethanol; and separating the black phosphorus from the polyphosphide anions.

2. The method of claim 1, wherein the alkali metal alkoxy compound or alkali metal alkyl thiolate compound is potassium ethoxide, potassium methoxide, sodium ethoxide, sodium methoxide, or sodium methyl thiolate.

3. The method of claim 1, wherein the organic solvent is methyl cyanide, dimethyl sulfoxide, dimethylformamide, or a combination of tetrahydrofuran and dimethoxyethane.

4. The method of claim 3, wherein the combination of tetrahydrofuran and dimethoxyethane is at a volume to volume ratio of 1:1.

5. The method of claim 1, wherein the reflux is performed for about 15 minutes to about 2 hours.

6. The method of claim 1, further comprising:

subjecting the compounds containing alkali metal and polyphosphide anions to a cation exchange with $(Bu_4N)Cl$ in ethanol to produce a cation-polyphosphide material; and redissolving the cation-polyphosphide material in acetonitrile to form free polyphosphide anions.

7. The method of claim 6, wherein the free polyphosphide anions are $P_5^-$, $P_{16}^{2-}$, $P_{21}^{3-}$, or a combination thereof.

8. The method of claim 1, wherein the red phosphorus has a grain size of about 1.4 mm to about 0.7 mm.

9. The method of claim 1, wherein the packing column is stainless steel, cast aluminum, A10 aluminum, A12 aluminum, stainless steel, aluminum-nickel alloy (50-50), polyimide, polyethylene terephthalate, polyamide-imide, nylon, polyvinyl chloride, polycarbonate, polyphthalamide, polysulfone, maleimide/bismaleimide, polyetheretherketone, polyetherimide, polyimide, polyester, acrylonitrile butadiene styrene, carbon reinforced-polyimide, carbon reinforced-polyethylene terephthalate, carbon reinforced-polyamide-imide, carbon reinforced-nylon, carbon reinforced-polyvinyl chloride, carbon reinforced-polycarbonate, carbon reinforced-polyphthalamide, carbon reinforced-polysulfone, carbon reinforced-maleimide/bismaleimide, carbon reinforced-polyetheretherketone, carbon reinforced-polyetherimide, carbon reinforced-polyimide, carbon reinforced-polyester, carbon reinforced-acrylonitrile butadiene styrene, glass reinforced-polyimide, glass reinforced-polyethylene terephthalate, glass reinforced-polyamide-imide, glass reinforced-nylon, glass reinforced-polyvinyl chloride, glass reinforced-polycarbonate, glass reinforced-polyphthalamide, glass reinforced-polysulfone, glass reinforced-maleimide/bismaleimide, glass reinforced-polyetheretherketone, glass reinforced-polyetherimide, glass reinforced-polyimide, glass reinforced-polyester, or glass reinforced-acrylonitrile butadiene styrene.

10. The method of claim 9, wherein the packing column is stainless steel and wherein the preselected temperature is at least 80° C.

11. The method of claim 9, wherein the stainless steel packing column is pressurized to about 8 bar.

12. The method of claim 1, wherein the packing column has an internal diameter of about 9 mm and a length of about 65 mm.

13. The method of claim 12, wherein the alkali metal alkoxy compound or alkali metal alkyl thiolate is flowed through the packing column at a rate of about 0.5 mL min$^{-1}$.

* * * * *